Jan. 5, 1954 W. F. GREEN 2,664,859
HYDRAULICALLY CONTROLLED FLUID DRIVEN RECIPROCATING ACTUATOR
Filed Sept. 11, 1950
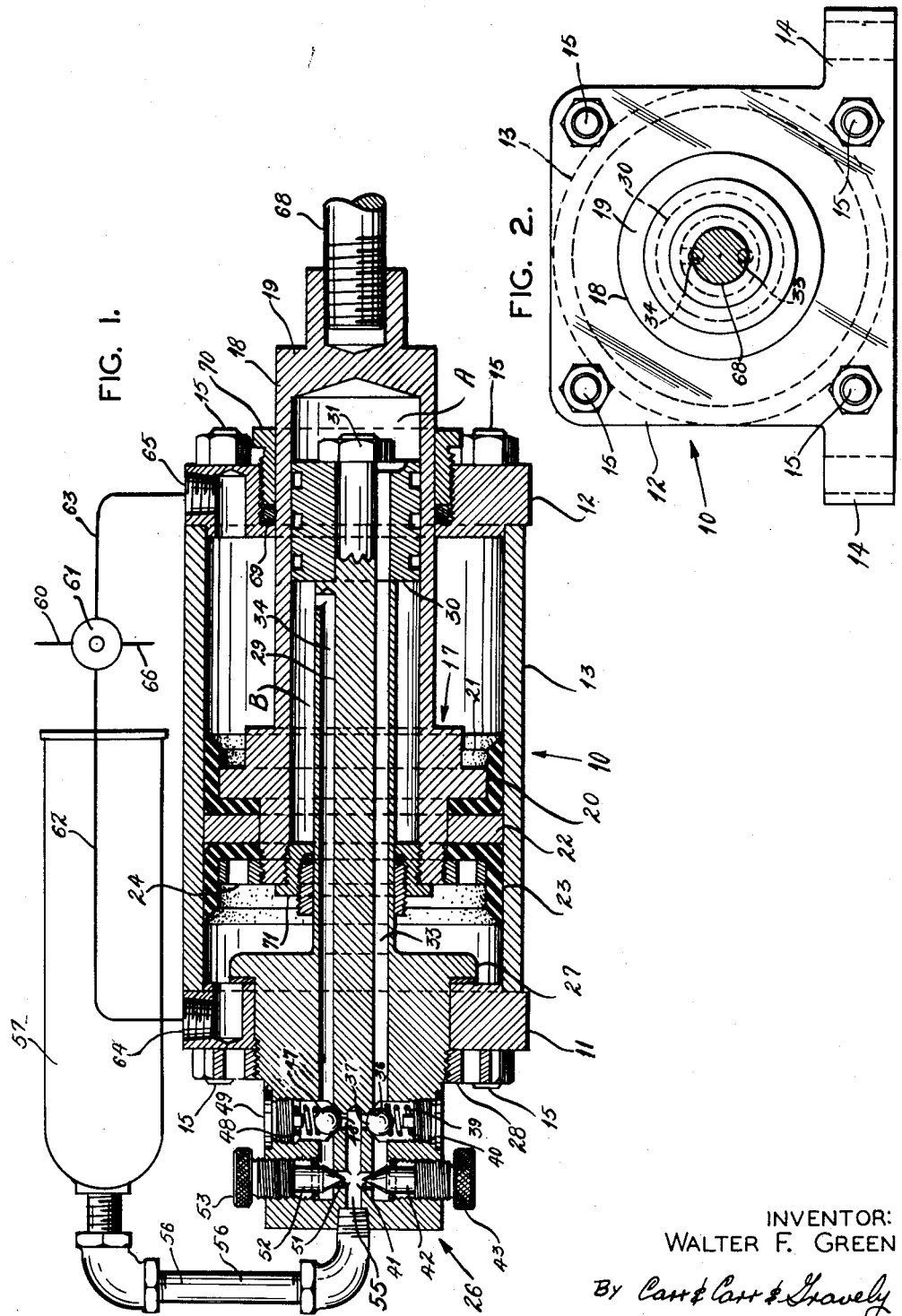
INVENTOR:
WALTER F. GREEN
By Carr & Carr & Gravely
ATTORNEYS.

Patented Jan. 5, 1954

2,664,859

UNITED STATES PATENT OFFICE 2,664,859

HYDRAULICALLY CONTROLLED FLUID DRIVEN RECIPROCATING ACTUATOR

Walter F. Green, Canton, Ohio, assignor to The Timken Roller Bearing Company, Canton, Ohio, a corporation of Ohio Application September 11, 1950, Serial No. 184,214

5 Claims. (Cl. 121—38)

This invention relates to improvements in fluid operated power units, and more specifically relates to such units which are operated by a compressible fluid and embody control means utilizing an incompressible fluid.

The power unit which forms the subject matter of the present invention is illustrated in the form of a compactly arranged fluid operated unit comprising a cylinder and piston structure to which a supply of compressible fluid, as air under pressure, is directed by means of a suitable control adapted to apply the compressed fluid alternately at opposite ends of the cylinder and simultaneously to exhaust the fluid previously introduced. One of the problems heretofore encountered in the use or application of such a fluid as compressed air to piston and cylinder type power units is the difficulty experienced in controlling the action or degree of movement imparted to the piston because of the compressibility of the air or other fluid utilized as the motive fluid. This control difficulty is usually directly related with the degree of external resistance or lack of resistance encountered during the power stroke of the piston, and when the resistance is inconsistent or subject to variations, the compressible characteristic of the motive fluid results in the development of substantial variations in the effective power delivery from the power unit.

It is also recognized that hydraulically actuated power units utilizing an incompressible fluid have the advantage over compressible fluid actuated power units, due to the incompressible nature of the motive fluid and the uniform response and ease with which the hydraulic motive fluid may be controlled. Hydraulically actuated power units, however, have the serious drawback that a considerable expense is required or involved in connection with the provision of electric motors and pump means, together with accessory equipment, necessary to the proper operation and function thereof. For this reason hydraulically operated power units have an exceedingly high first cost as compared with air or compressible fluid operated power units.

It is a principal object of the present invention to provide a compact, simple and inexpensive power unit which combines the advantageous characteristics of the above mentioned general types of power units, and eliminates certain of the more objectionable characteristics and features thereof.

It is also an important object of the present invention to provide a fluid operated power unit having a hydraulically responsive control system combined therewith so that the inexpensive and advantageous features attendant upon the utilization of a compressible fluid may be had in connection with the equally advantageous characteristics and ease of control resulting from the application of a hydraulic control system.

In carrying out the above objects of the present invention, I prefer to construct my power unit so that the main or power piston is centrally open and is provided with a hollow, elongated body extension or rod defining a chamber or space within or in association with the power piston. I also prefer to provide the cylinder in which the power piston operates, with a valve body or valve containing member which has a fixed relationship with the cylinder and to provide on the valve member an extension or pilot rod which projects into the elongated chamber of the power piston. This avoids excessive length of the unit in relation to motion of the rod, and results in an exceptionally compact unit. The pilot rod is adapted to carry a plunger or control piston in fixed relation within such space. The plunger carried by the pilot rod effectively subdivides the chamber formed in the power piston into spaced chambered areas having communication with each other through suitable passage means leading through the pilot rod and into the valve body, so that cross-connection of the passage means and inter-communication of the subdivisions of the main piston chamber may be readily controlled through a suitable combination of adjustable valve elements and check valves operatively disposed within the valve body. The main power piston is reciprocated within the cylinder by means of a controllable source of air or compressible fluid which may be easily and cheaply supplied from a storage tank. The chambered subdivisions in the power piston and its body extension together with the passages in the pilot rod and valve body are adapted to define a substantially closed fluid system containing an incompressible fluid. In this combination, the control system imposes a uniform opposing pressure effect upon the motion of the main power piston with the result that the rate of motion of the power piston may be determined exactly according to the requirements of the object to be operated thereby.

It is, therefore, a further object of the present invention to provide a relatively simple and inexpensive power unit and control system therefor which will provide for the obtaining of a uniform control over the delivery of power from the power unit, and which may also be arranged to control the rate of motion of the power piston in either direction so that there may be provided a slow rate of displacement in one direction and a relatively faster rate of displacement in the opposite direction, or any desirable and selective variation from this.

Further objects and advantages will be hereinafter pointed out in connection with the detailed description relating to a presently preferred embodiment of my invention illustrated in the accompanying drawing wherein:

Fig. 1 is a longitudinal sectional elevational view through the power unit assembly forming the presently preferred embodiment of my invention; and Fig. 2 is an end elevational view of the power unit shown in Fig. 1.

In the drawing I have illustrated the power unit 10 as comprising end closure members 11 and 12 suitably formed to provide a seat for the respective ends of a cylindrical member or sleeve 13. Each of the end members 11 and 12 is formed, as illustrated in connection with Fig. 2 (the member 12 being disclosed in this latter view) with laterally extended lugs 14 forming mounted means for the securement of the power unit in or on any suitable base or installation. End members 11 and 12 are also provided with four apertures in each of which body bolt 15 may be positioned for the securement of the member 12 with member 11 in a manner which should appear obvious.

The power unit 10 contains a chambered piston assembly which is comprised of body 17 and a hollow rod or body extension 18 having its closed end 19 projecting outwardly through the cylinder end member 12. The body 17 of this piston assembly is formed with an annular flange 20 defining a seat to receive a cup element 21, a backing disc 22, a second cup element 23 and an annular clamping element 24.

In the present construction the cylinder end member 11 is adapted to support or carry a valve body 26 which is formed with an internal radial flange 27 and an external threaded portion which receives a clamping ring 28 to secure the body 26 on the end member 11. The valve body 26 carries a pilot rod or body extension 29 which is directed axially of and into the chambered space formed by the hollow piston body 18. The inner most end of the pilot rod is turned down to reduce its diameter, thereby to provide a mounting seat for the reception of a plunger element 30, the plunger 30 being secured in fixed position on the pilot rod by the cap nut 31. It is, therefore, apparent that the plunger 30 effectively subdivides the chamber formed in the hollow body extension 18 into spaces designated at A and B, the space or subdivision B having the characteristic that it is an annular chamber formed between the pilot rod and the walls of the piston body 17 and its extension 18. The chamber subdivision or space A is provided with a communicating passage 33 leading through the pilot rod and into the valve body 26. Similarly the annular space or subdivision B is provided with a passage 34 which generally parallels but is spaced from passage 33 and extends into the valve body 26.

Valve body 26 is suitably counterbored or otherwise formed at one end of passage 33 to provide a valve seat 36 against which a ball type check valve 37 is adapted to seat under the urging of a valve spring 39 held in position by a removable cap 40. Adjacent the location of the ball check valve 37, the passage 33 is additionally provided with a port 41 in alignment with an externally opened threaded bore which receives an adjustable needle valve 42 having the adjustment element 43. Needle valve 42 is adapted to regulate the degree of opening at the port 41. In a like manner, the elongate passage 34 is provided with a seat 46 for the reception of a ball check valve 47 normally held on seat 46 by means of a valve spring 48 and cap 49. Passage 34 is also provided with a port 51 which, in this embodiment, is in axial alignment with port 41 for passage 33. Port 51 is adapted to be controlled by means of a needle valve 52 adjustably positioned through the agency of an externally extending adjustment element 53. The valve body 26 is furthermore provided with a passage 55 which is common to the ports 41, 51 and the respective ball check valve seats 36 and 46. Passage 55 is also in communication with a suitable conduit 56 leading to a fluid reservoir or make-up container 57.

The main power piston is adapted to be actuated by a compressible fluid, as air, supplied to the cylinder from a source, not shown, but connected to the supply line 60, shown schematically in connection with Fig. 1. The supply line 60 is connected with a four-way control member 61 selectively adjustable so as to deliver a charge of air under pressure through lines 62 or 63 to the opposite ends of the power unit 10. The lines 62 and 63 are connected at cylinder inlet ports 64 and 65 respectively. For example, if the control 61 is set to deliver compressed air through line 62 to port 64, the corresponding port 65 and line 63 will be conditioned to exhaust air from behind the power piston 17 at discharge line 66. When line 63 and port 65 are utilized to deliver air within the cylinder, port 64 and line 62 are conditioned by the control 61 for exhausting air from the cylinder. The resulting reciprocation of the main power piston 17 is transmitted through the hollow body extension 18 to the rod 68 and thence to the device or unit to be driven, but not here shown.

The piston body extension 18 is adapted to have a working fit within the cylinder end member 12 and for this purpose a suitable sealing ring 69 and seal retainer or gland 70 is provided in the member 12. Also, as a consequence of the reciprocatory motion of the piston body 17 relative to the pilot rod 29, the inner end or body portion 17 of the power piston is provided with a suitable seal assembly at 71 to provide a positive closure for the chamber subdivision or space B within the piston body.

Having now described a preferred construction which my present invention may have, I will now proceed to describe briefly its operation. With reference to Fig. 1, let it be assumed that control 61 is set to deliver a compressible motive fluid at port 64 so that the main power piston 17 is urged toward the right in this view. As a consequence thereof, the piston body extension 18 will move relative to the plunger 30 and the resulting tendency will be for the subdivision or chamber A to have its volume increased and for subdivision or chamber B to have its volume decreased. Chambers A and B together with the communicating passages 33 and 34 and associated valve ports in valve chamber 26 are at all times substantially flooded or completely filled with an incompressible fluid of any suitable type, as oil.

from the reservoir 57. The action of the main piston 17 in its displacement to the right relative to plunger 30 is to reduce the volume of the chamber or subdivision B and thereby eject or squeeze the incompressible control fluid from this chamber to and through passageway 34. This fluid transfer or displacement acts to impose a force on the piston in opposition to the motive fluid due to the fact that the check valve ball element 47 is held on its seat 46, thereby constraining such fluid to pass on to the needle valve 52 where its rate of passage or escape may be determined by the degree of opening afforded at port 51 through the adjustment of the needle valve 52. The transfer of fluid continues into the passage 55 where it is in communication witht he reservoir 57 and with the ports controlled by the ball check valve 37 and the needle valve 42.

Subdivision or chamber A of the power piston undergoes an increase in its volumetric capacity and consequently tends to attain a sub-atmospheric condition which is utilized to assist the transfer or flow of the control fluid from the passage 55 through the passage 33 to the chamber or subdivision A. At this time, if the adjustable needle valve 42 is set to restrict the opening at port 41, the major flow of the fluid in this portion of the control system will be directed past the ball check valve 37 and into passage 33 due to the comparatively unrestricted back pressure afforded by the ball check valve 37. Regardless of the pressure or rate of delivery of motive fluid through line 62 and port 64 to the cylinder of the power unit 10 it will be obvious that the rate of decrease of capacity or volume of the chamber or subdivision B will be directly related to the setting of the adjustable needle valve 52 with respect to port 51. Therefore, the rate of movement of the main power piston 17 toward the right, as viewed in Fig. 1, can very conveniently and nicely be regulated by the setting of the needle valve 52 by the externally projecting adjustment means 53. It should be obvious from the foregoing description of operation that the motion of the main power piston 17 in the reversed direction or toward the left will be controlled at a rate determined upon by the setting of the needle valve 42 with respect to its port 41 by the externally projecing adjustment 43. During this phase of the operation the ball check valve 37 will be held on its seat 36 and the flow of fluid in the common passage 55 will be directed past the ball check valve 47 toward chamber or subdivision B.

The foregoing description relates to a principal embodiment of my invention. However, I wish it to be understood that modifications may be made herein without departing from the spirit and scope of the claims next appearing.

What I claim is:

1. In a fluid pressure responsive device, a cylinder, a piston and hollow rod assembly reciprocable in said cylinder under the influence of a motive fluid for operating the device, a member fixed at one end of said cylinder, said member having a valve body integral therewith annd exposed at the end of said cylinder, a pilot rod extending into said cylinder from said member and into said hollow rod, said pilot rod being provided with passages therein opening into the hollow rod, a plunger on said pilot rod subdividing the space in the hollow rod into separate chambers each communicating with a passage in said pilot rod, said separate chambers and passages constituting portions of a substantially closed fluid containing system in which reciprocation of said piston and hollow rod effects a change in the relative volumetric capacities of said chambers in an inverse relation, separately adjustable valve means carried by said valve body in position to control the flow of fluid in each of said passages for imposing a restriction upon the flow of fluid in the passage from that chamber experiencing a decrease in volume, and separate valve means in said valve body adjacent said adjustable valve means for automatically bypassing said first mentioned valves and opening the passage through which fluid is directed to the chamber experiencing an increase in volume.

2. A fluid operated and fluid controlled power unit comprising a cylinder having ports in its end zones for the admission and exhaust of a motive fluid, a power piston movable in said cylinder under the influence of the motive fluid, a hollow piston extension, a plunger in said piston extension subdividing the space therein, a pilot rod connected with said plunger to locate the same adjacent one end of said cylinder in a fixed position relative to said piston extension, a member carried by said cylinder at the other end thereof and to which said pilot rod is connected, said member and pilot rod providing passages therein communicating one with each of the space subdivisions in said piston extension and further having a common passage communicating with each of said first passages, there being a pair of ports for each of said first passages opening to said common passage, and control valve means for each pair of ports including oppositely related adjustable valve elements and oppositely related ball check valve elements.

3. A fluid operated and fluid controlled power unit comprising a cylinder having motive fluid inlet ports in its opposite ends, a power piston movable in said cylinder, a source of motive fluid connected with said ports for alternate admission therethrough to reciprocate said piston, a hollow piston rod for said piston movable outwardly of one end of said cylinder, a valve body in the opposite end of said cylinder, a pilot rod extending into said hollow piston rod from said valve body, a plunger carried on said pilot rod and adapted to divide the space in said hollow piston rod into separate chambers whose volumes vary inversely upon relative movement between said hollow piston rod and plunger, said pilot rod having separate passages leading from said valve body for said separate chambers, a source of control fluid connected through said valve body between said passages for maintaining the chambers substantially filled, and two pairs of valves in said valve body disposed for opposite operation to alternately regulate communication between said passages to govern the flow of control fluid between said spaced chambers.

4. A fluid pressure responsive device comprising a cylinder, a piston reciprocable in said cylinder, a hollow extension on said piston forming an internal chamber, a valve body carried by said cylinder, a pilot rod on said valve body and extending into the piston chamber, a plunger on said pilot rod subdividing the piston chamber, each of the chamber subdivisions having a passage opening thereto and communicating with said valve body to constitute a closed fluid system between the chamber subdivisions at each side of said plunger, the reciprocation of said piston causing alternate reductions in the volume of said chamber subdivisions and a corresponding transfer of fluid between said chamber subdivisions, and dual valve means in said valve body arranged in opposite relation for alternate operation to impose a restriction on the rate of fluid transfer out of the chamber subdivision undergoing a reduction in volume and a simultaneous and substantially unrestricted fluid flow into the enlarging chamber.

5. A fluid pressure responsive device as defined in claim 4, and further characterized in that said dual valve means, includes adjustable needle valves for regulating the rate at which fluid transfer takes place from the chamber subdivision undergoing a reduction in volume, and automatic ball check valves arranged to open toward the chamber subdivision undergoing an increase in volume for a substantially unrestricted transfer of fluid thereto.

WALTER F. GREEN.

References Cited in the file of this patent

UNITED STATES PATENTS

| Number | Name | Date |
|---|---|---|
| 489,757 | Reilly | Jan. 10, 1893 |
| 789,566 | Riddell | May 9, 1905 |
| 1,205,818 | Thomas | Nov. 21, 1916 |
| 1,824,833 | Nordberg | Sept. 29, 1931 |
| 2,428,640 | Smith | Oct. 7, 1947 |
| 2,604,953 | Campbell | July 29, 1952 |